(12) United States Patent
Arnold et al.

(10) Patent No.: US 7,319,744 B1
(45) Date of Patent: Jan. 15, 2008

(54) UNIFIED MESSAGING/CALL ROUTING CONFIGURATION USING PALMTOP COMPUTER

(75) Inventors: Greg Arnold, Sunnyvale, CA (US); Fermin Soriano, Sunnyvale, CA (US)

(73) Assignee: PalmSource, Inc., Sunnyvale, CA (US)

( * ) Notice: Subject to any disclaimer, the term of this patent is extended or adjusted under 35 U.S.C. 154(b) by 3 days.

(21) Appl. No.: 09/775,321

(22) Filed: Jan. 31, 2001

(51) Int. Cl.
*H04J 3/16* (2006.01)
(52) U.S. Cl. .............. 379/201.03; 379/119; 379/88.13; 340/815.4; 361/681; 455/445; 709/203
(58) Field of Classification Search ................ 709/200, 709/205, 203; 379/201.12, 207.02, 207.03, 379/211.01, 211.02, 201.03, 119, 201.01, 379/88.13; 340/815.4; 455/445, 555; 361/681
See application file for complete search history.

(56) References Cited

U.S. PATENT DOCUMENTS

| | | | | |
|---|---|---|---|---|
| 5,644,516 A | * | 7/1997 | Podwalny et al. | .......... 361/681 |
| 6,047,053 A | * | 4/2000 | Miner et al. | ........... 379/201.01 |
| 6,052,592 A | * | 4/2000 | Schellinger et al. | ........ 455/445 |
| 6,453,164 B1 | * | 9/2002 | Fuller et al. | ................ 455/445 |
| 6,584,490 B1 | * | 6/2003 | Schuster et al. | ............ 709/200 |
| 6,606,505 B1 | * | 8/2003 | Chow et al. | ................ 455/555 |
| 6,668,046 B1 | * | 12/2003 | Albal | ......................... 379/119 |
| 6,735,614 B1 | * | 5/2004 | Payne et al. | ................ 709/203 |
| 6,831,568 B1 | * | 12/2004 | Cortopassi et al. | ...... 340/815.4 |

* cited by examiner

*Primary Examiner*—Gerald Gauthier
(74) *Attorney, Agent, or Firm*—Berry & Associates P.C.

(57) ABSTRACT

A method of routing telephone calls, emails and faxes using a palmtop computer. Using a date book forming a part of a personal information manager application of a palmtop computer, the user enters an appointment into the date book. Such an appointment has a starting and an ending time. The user then selects (either at the time of entry of the appointment or after receipt of an alarm reminder of the appointment) a destination telephone number for routing of telephone calls between the starting time and the ending time. This selection can be in the form of a menu selection of a predetermined profile for routing telephone calls. The palmtop computer then sends a representation of the destination telephone number, the starting time and the ending time to a telephone call server (and/or email server and/or fax server), so that the telephone call server routes telephone calls to the destination telephone number between the starting time and the ending time.

13 Claims, 10 Drawing Sheets

| NEW PROFILE DATA: | |
|---|---|
| PROFILE NAME: EMERGENCY | ← 704 |

| DESTINATION NUMBERS: | |
|---|---|
| PRIMARY: 123-555-4444<br>SECONDARY: 123-555-7777 | ← 708 |

| ROUTE CALLS FROM: | |
|---|---|
| 123-555-2222<br>111-555-1199<br>123-555-9876 | ← 712 |

| REJECT CALLS FROM: | |
|---|---|
| ALL | ← 714 |

DATA ENTRY FORM

700

US 7,319,744 B1

UNIFIED MESSAGING/CALL ROUTING CONFIGURATION USING PALMTOP COMPUTER

FIELD OF THE INVENTION

The present invention relates to the field of controlling telephone, fax and email routing. More particularly, the present invention relates to control of telephone, fax and email routing using a palmtop computer.

BACKGROUND

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Most palmtop computer systems are used to implement various Personal Information Management (PIM) applications such as an address book, a daily organizer and electronic notepads, to name a few.

For many workers today there are a wide variety of methods by which they can be contacted by telephone. For example, any particular individual might have one or more home telephones, one or more office telephones, perhaps an answering service, an assistant, a cellular telephone, a voice mail system, as well as multiple email addresses and fax numbers by which the individual can be contacted. Someone wishing to contact that individual (assuming that individual wishes to be contacted) is thus presented with many potential actions for contacting the individual with an associated limited possibility of success at any given telephone number. Moreover, there are times when the individual might not wish to be contacted directly by anyone or by certain individuals. It would be desirable to be able to utilize a palmtop computer to organize this aspect of an individual's life.

SUMMARY OF THE INVENTION

Accordingly, what is needed is convenient technique for management of telephone calls, emails and faxes using a palmtop computer.

In accordance with one embodiment consistent with the present invention, a method of routing telephone calls, emails and faxes using a palmtop computer is provided. Using a date book forming a part of a personal information manager application of a palmtop computer, the user enters an appointment into the date book. Such an appointment has a starting and an ending time. The user then selects (either at the time of entry of the appointment or after receipt of an alarm reminder of the appointment) a destination telephone number for routing of telephone calls between the starting time and the ending time. This selection can be in the form of a menu selection of a predetermined telephone call routing profile for routing telephone calls. The palmtop computer then sends a representation of the destination telephone number or numbers, the starting time and the ending time to a telephone call server (and/or an email server and/or a fax server), so that the telephone call server routes telephone calls to the destination telephone number or numbers between the starting time and the ending time. This provides the user with the ability to manage telephone calls using a palmtop computer.

In accordance with an embodiment consistent with the present invention, a method of directing telephone calls from a palmtop computer includes: receiving entry of an appointment into an electronic calendar program residing on the palmtop computer, the appointment having a starting and an ending time; receiving a selection of a destination for a telephone call during the time duration of the appointment at the palmtop computer; and sending a message from the palmtop computer to a telephone call server instructing the telephone call server to direct telephone calls to the destination between the starting and ending times.

In another embodiment consistent with the present invention, a palmtop computer that directs a user's telephone calls includes a central processor. An electronic calendar program runs on the central processor. A data entry arrangement receives entry of an appointment into an electronic calendar program residing on the palmtop computer, the appointment having a starting and an ending time. The data entry arrangement also receives a selection of a destination for a telephone call during the time duration of the appointment at the palmtop computer. The palmtop computer sends a message to a telephone call server instructing the telephone call server to direct telephone calls to the destination between the starting and ending times.

Another method of controlling telephone routing consistent with the present invention includes: opening a date book forming a part of a personal information manager application of a palmtop computer; entering an appointment in the date book, the appointment having a starting and an ending time; selecting a destination telephone number for routing of telephone calls between the starting time and the ending time; and sending a representation of the destination telephone number, the starting time and the ending time to a telephone call server, so that the telephone call server routes telephone calls to the destination telephone number between the starting time and the ending time.

Similar techniques can be used to route fax communication and email communication without departing from the invention. For example, in another embodiment of the invention, a method of directing communications using a palmtop computer includes: receiving entry of an appointment into an electronic calendar program residing on the palmtop computer, the appointment having a starting and an ending time; receiving a selection of a destination for a communication during the time duration of the appointment at the palmtop computer; and sending a message from the palmtop computer to a communication server instructing the communication server to direct communications to the destination between the starting and ending times.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

FIG. 7 illustrates an embodiment of a data entry screen for entering a telephone call routing profile consistent with the present invention.

DETAILED DESCRIPTION OF THE INVENTION

Figure 1:
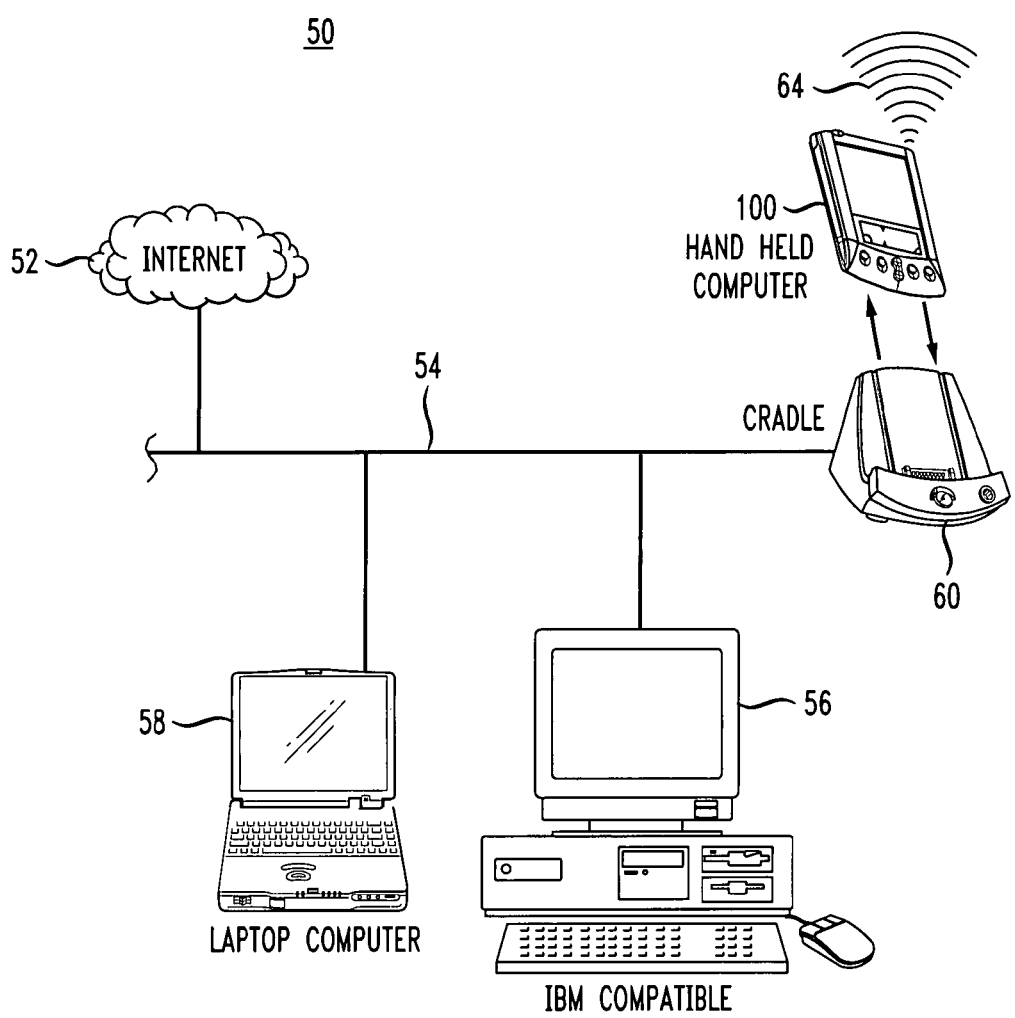
FIG. 1 is system illustration of a palmtop computer system connected to other computer systems and the Internet via a cradle device.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Unified Messaging/Call Routing Configuration Using Palmtop Computer in Accordance with the Present Invention While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

FIG. 1 illustrates a system 50 including a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Bus 54 is also coupled to a cradle 60 for receiving and initiating communication with a palmtop ("palm-sized") portable computer system 100 of the present invention. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

Figure 2A:
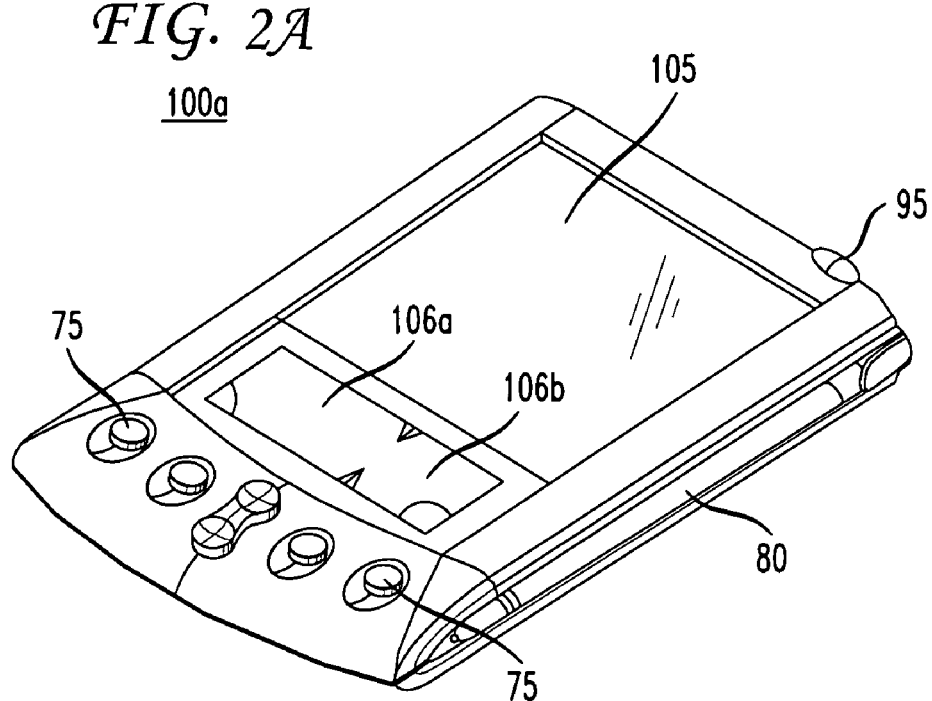
FIG. 2A is a top side perspective view of a palmtop computer system that can be used as a platform for data entry.

FIG. 2A is a perspective illustration of the top face 100a of one embodiment of the palmtop computer system of the present invention. The top face 110a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alphabetic characters therein for automatic recognition and region 106b is for the drawing of numeric characters therein for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 2B:
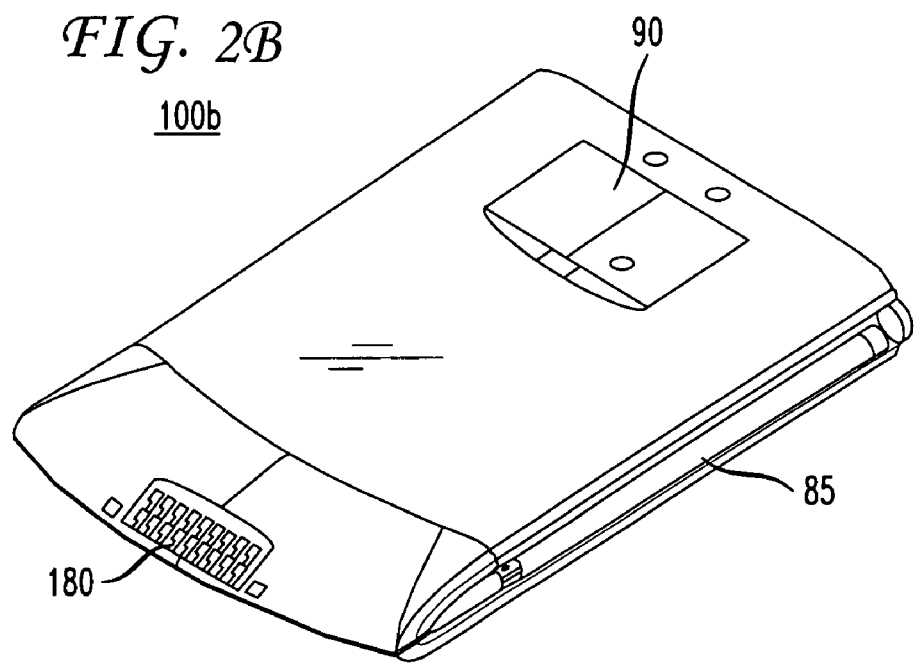
FIG. 2B is a bottom side perspective view of the palmtop computer system of FIG. 2A.

FIG. 2B illustrates the bottom side 100b of one embodiment of the palmtop computer system of the present invention. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, USB (Universal Serial Bus), etc. In addition to providing the serial interface, some versions of palmtop computers consistent with the present invention include charging terminals for charging internal batteries through the cradle connection at interface 108. Accordingly, interface 108 typically comprises approximately ten to twelve electrical connector terminals.

Figure 3:
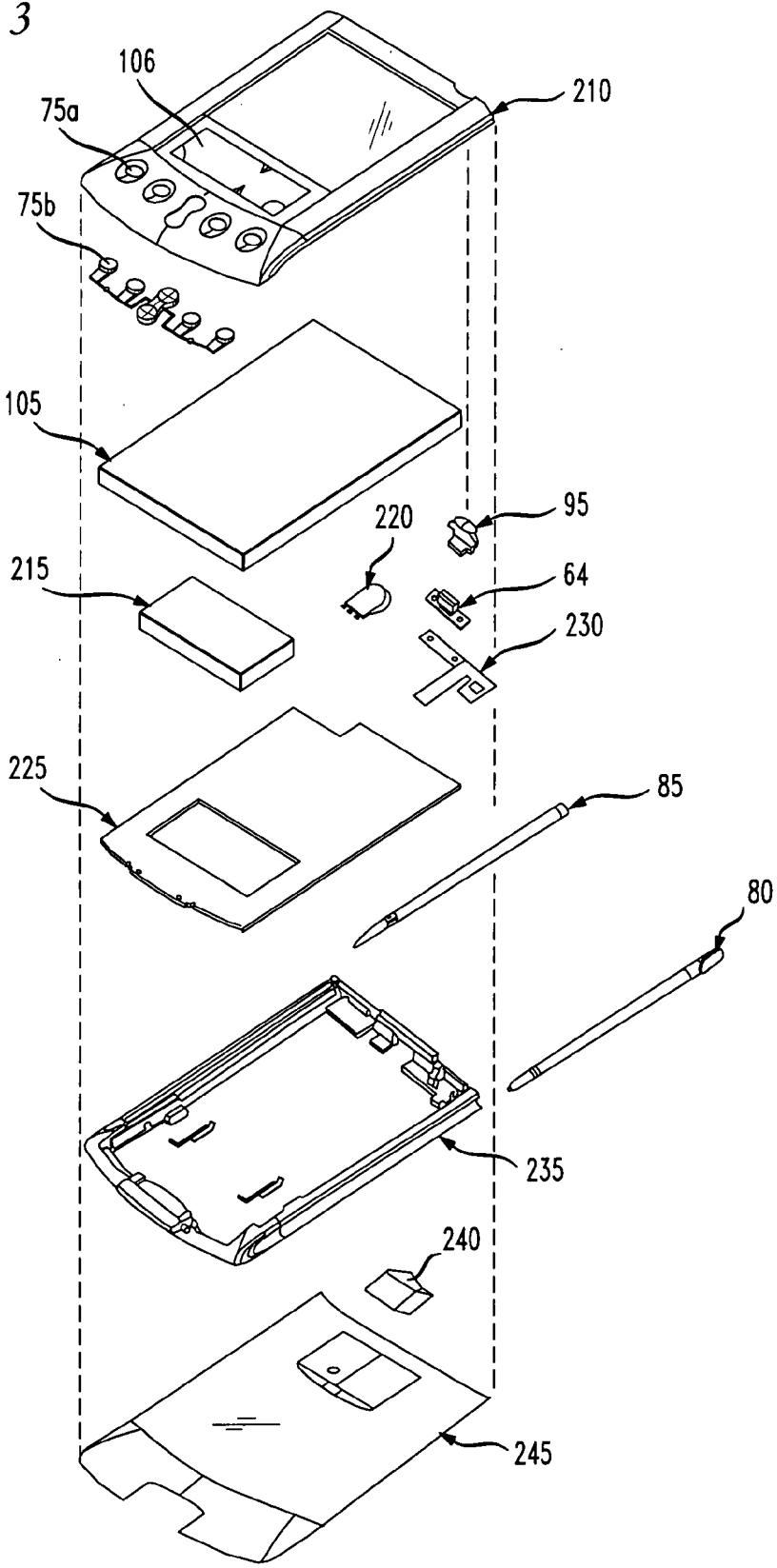
FIG. 3 is an exploded view of the components of the palmtop computer system of FIG. 2A.

FIG. 3 is an exploded view of the palmtop computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is shown.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation the Mobitex wireless communication system is used to provide two way communication between system 100 and other networked computers and/or the Internet via a proxy server.

Figure 4:
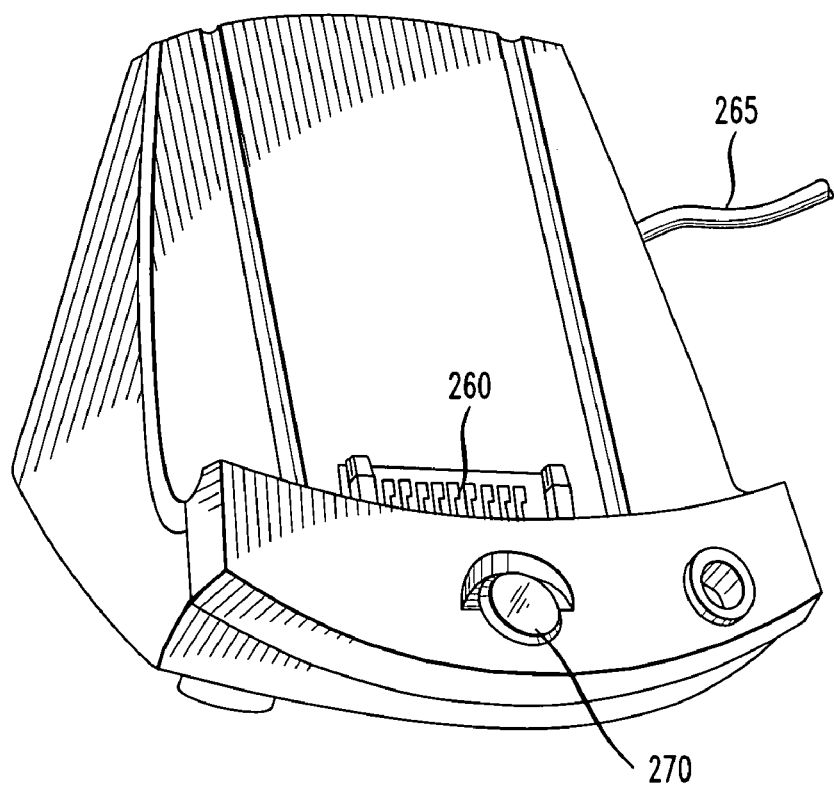
FIG. 4 is a perspective view of the cradle device for connecting the palmtop computer system to other systems via a communication interface.

FIG. 4 is a perspective illustration of one embodiment of the cradle 60 for receiving the palmtop computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265.

Figure 5:
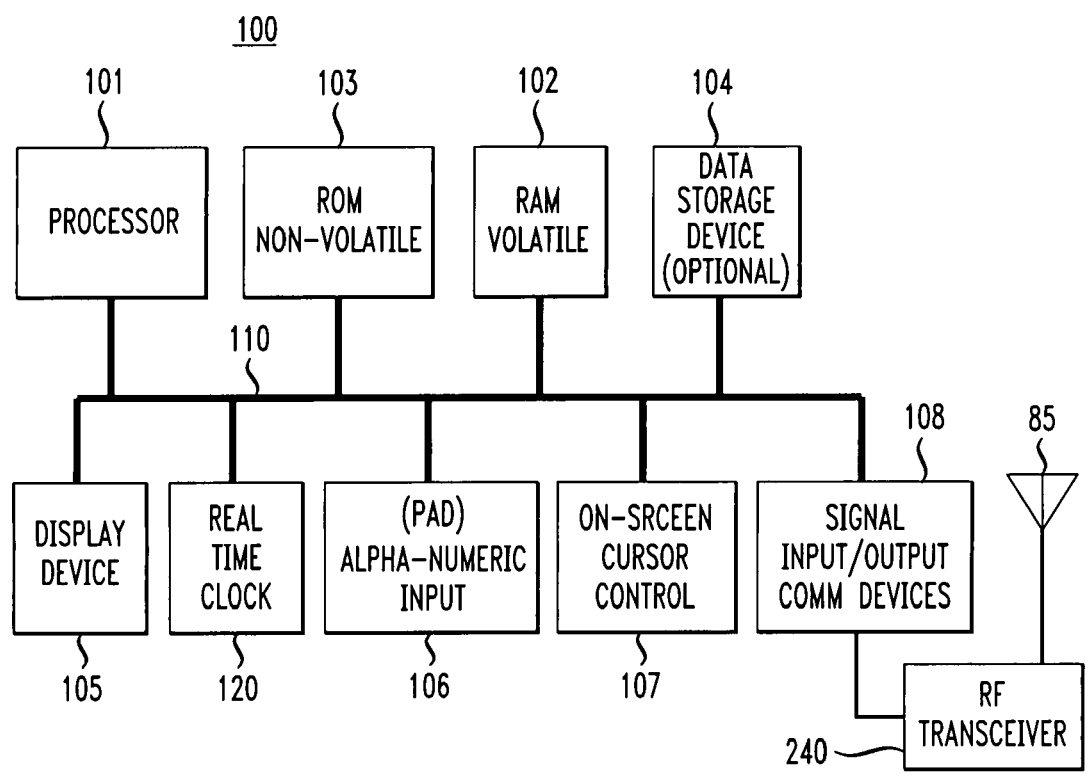
FIG. 5 is a logical block diagram of the palmtop computer system in accordance with an embodiment of the present invention.

FIG. 5 illustrates circuitry of computer system 100, some of which can be implemented on PC board 225. Computer system 100 includes an address/data bus 100 for communicating information, a central processor 101 coupled with the bus for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 110 also includes an optional data storage device 104 (e.g., memory stick, SD memory, etc.) coupled with the bus 100 for storing information and instructions. Device 104 can be removable. As described above, system 100 also contains a display device 105 coupled to the bus 100 for displaying information to the computer user. PC board 225 can contain the processor 101, the bus 100, the ROM 103 and the RAM 102.

Also included in computer system 110 of FIG. 5 is an optional alphanumeric input device 106 which in one implementation is a handwriting recognition pad ("digitizer") having regions 106a and 106b (FIG. 2A), for instance. Device 106 can communicate information and command selections to the central processor 101. System 110 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact. The display device 105 utilized with the computer system 110 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal communication device 108, also coupled to bus 100, can be a serial port for communicating with the cradle 60. Device 108 can also include an infrared communication port. A real time clock 120 can also be coupled to bus 100.

Figure 6:
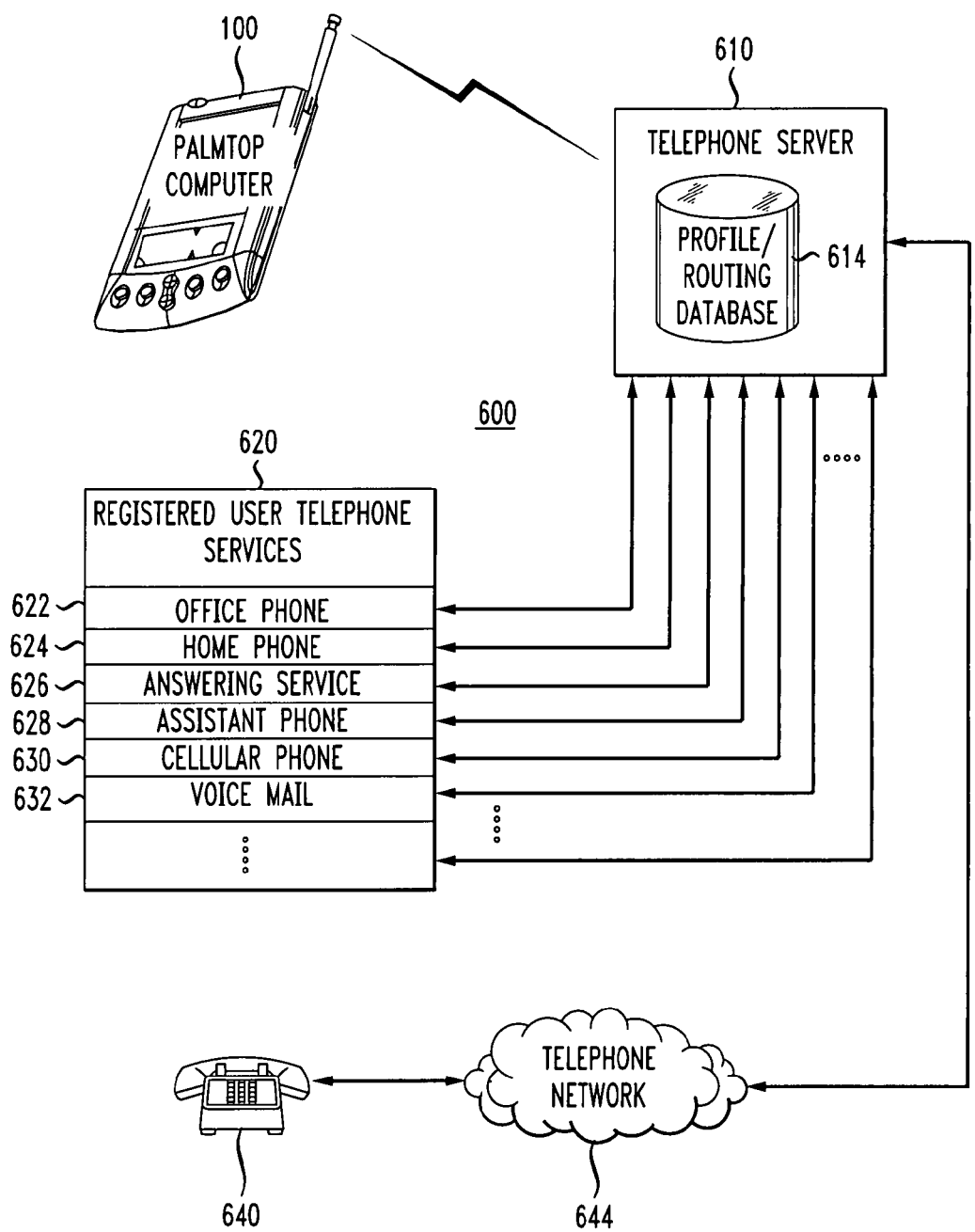
FIG. 6 illustrates a telephone routing system under control of a palmtop computer in a manner consistent with embodiments of the present invention.

A palmtop computer 100 such as that previously described can be advantageously utilized to permit a user to control the access to the user by telephone, fax or email. FIG. 6 illustrates an exemplary system for providing such control over telephone calls in which palmtop computer 100 communicates with a telephone server 610 (and/or an email server and/or a fax server). The invention will be easily extended to control of fax and email communication by those skilled in the art. This communication can be effected either by a wireless radio frequency link to the telephone server 610 from the palmtop computer 100 or alternatively by a hard wired connection during a synchronization operation, e-mail or other suitable communication technique. In accordance with embodiments of the present invention, palmtop computer 100 sends an HTML message to the telephone server 610 establishing rules for routing telephone calls to the various telephone numbers associated with the user. This is depicted conceptually by the various connections from the telephone server 610 to the registered users telephone services 620 including an office phone 622, a home telephone 624, an answering service 626, an assistants telephone 628, a cellular telephone 630 and a voice mail system 632. Of course, this is not to be limiting since any other suitable telephone connection such as multiple office telephones, etc., can be manipulated in accordance with the present invention.

Therefore, when utilizing the present invention, a telephone call from, for example, telephone 640 through the telephone network 644 to the telephone server 610 is routed to an appropriate one of the users registered telephone services 620 in accordance with the telephone call routing profile stored in a routing database 614. The telephone call routing profiles stored in the routing database are communicated from the palmtop computer 100 in accordance with telephone call routing profiles associated with a users calendar application forming a part of the personal information manager of palmtop computer 100. For reference, TABLE 1 below provides an exemplary set of telephone numbers associated with a particular user to be used in exemplary embodiment in accordance with the present invention.

TABLE 1

USER'S TELEPHONES

| | |
|---|---|
| OFFICE | 123-555-1234 |
| HOME | 123-555-2222 |
| VOICE MAIL | 123-555-3333 |
| CELLULAR PHONE | 123-555-4444 |
| ASSISTANT'S TELEPHONE | 123-555-7777 |

In addition, TABLE 2 below illustrates a set of telephone call routing profiles established for routing telephone calls to a user having a main telephone number shown as 123-555-4321. In this exemplary embodiment, the user has established seven telephone call routing profiles entitled home, voice mail, meeting, urgent only, assistant, emergency and mobile. Associated with each of these telephone call routing profiles is a destination phone number or phone numbers to which the call will be routed. In several instances, multiple phone numbers are listed in which case failure to connect within a predetermined number of rings on the primary number will result in the call being transferred to the secondary number. In addition, the telephone call routing profile is able to filter the calls based upon the source so that all calls can be accepted and routed to the destination number, only certain source numbers will be routed to the destination number with other numbers being rejected in some manner (for example, a busy signal or a default voice mail message) or all calls with certain exceptions will be routed to a particular destination number.

TABLE 2

PROFILES FOR USER PHONE NUMBER 123-555-4321

| PROFILE NAME | SOURCE NUMBERS | DESTINATION NUMBER |
| --- | --- | --- |
| HOME | ALL EXCEPT: 123-555-9999 | 123-555-2222 |
| VOICE MAIL | ALL | 123-555-3333 |
| MEETING | ALL | 123-555-7777/ 123-555-3333 |
| URGENT ONLY | ALL | 123-555-7777/ 123-555-4444 |
| ASSISTANT | ALL | 123-555-7777 |
| EMERGENCY | 123-555-2222 111-555-1199 123-555-9876 | 123-555-4444/ 123-555-7777 |
| MOBILE | ALL | 123-555-4444 |

In one process consistent with the present invention, such telephone call routing profiles can be entered into the display 105 of palmtop computer 100 by use of a data entry form similar to that illustrated as 700 in FIG. 7. In this example data entry form, a telephone call routing profile name is entered into region 704. Destination numbers (primary and secondary) are entered into section 708. For this telephone call routing profile, calls are routed if received from the telephone numbers listed in region 712 and all other calls are rejected as shown in region 714. In this manner, a user can establish a menu selection for later use which will be referred to simply by the telephone call routing profile name, in this case "emergency."

Figure 8:
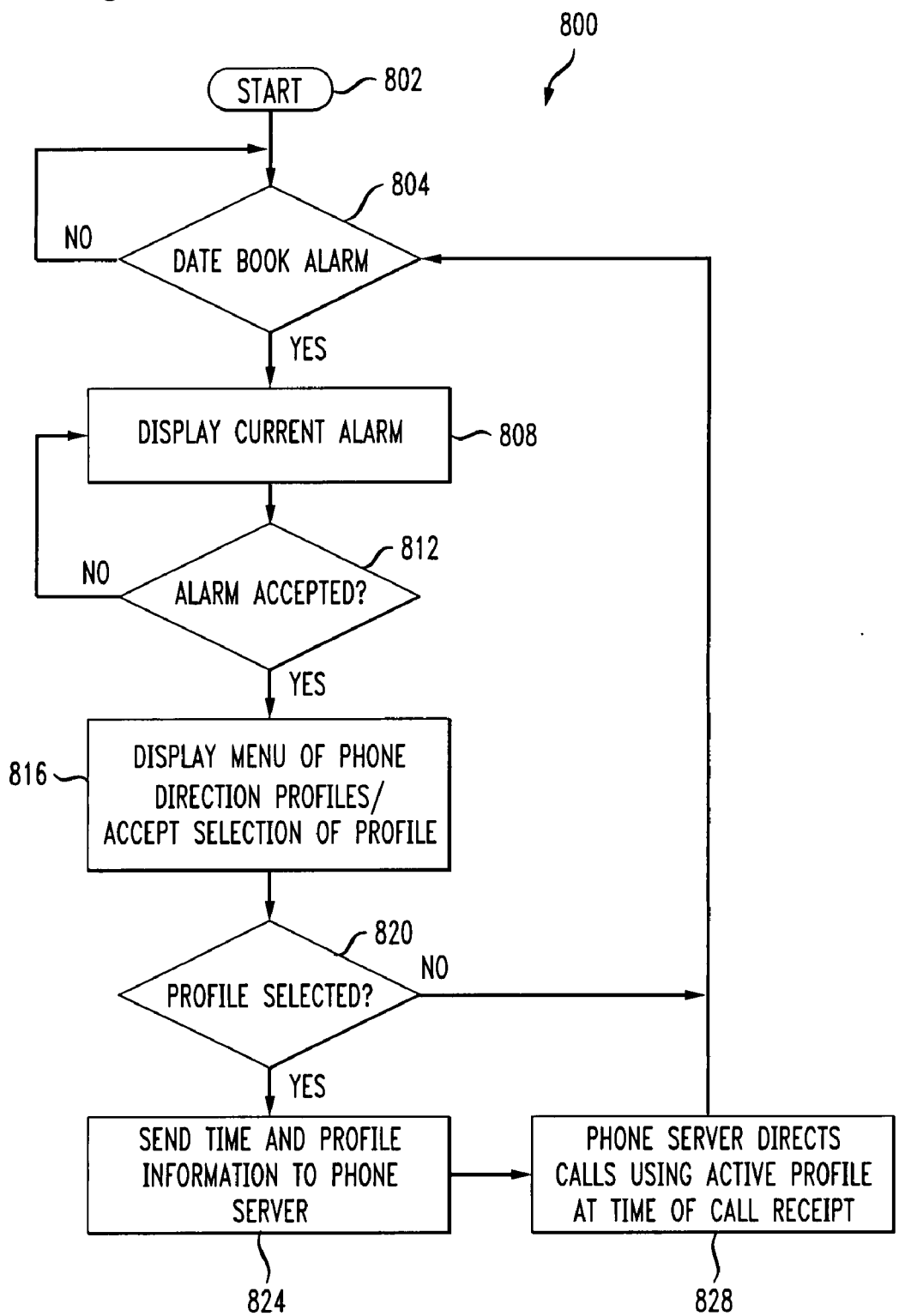
FIG. 8 illustrates a first process for implementing an embodiment of the call routing of the present invention.

Referring now to FIG. 8, a process 800 is illustrated starting at 802 for implementing an embodiment of the present invention. At 804, a previously established date book alarm sounds to alert the user that it is time for a particular activity that the user has scheduled in his date book application in the personal information manager of palmtop computer 100. The alarm, which is indicative of the approach of a particular appointment, is displayed at 808 to the user until the user accepts the alarm at 812 (e.g., by tapping a button on the display). Upon accepting the alarm at 812, the palmtop computer displays a menu of telephone call routing profiles so that the user can accept one of the telephone call routing profiles at 816. If no telephone call routing profile is accepted at 820, control returns to 804 until the next date book alarm sounds. However, if a telephone call routing profile is selected at 820, information relating to the particular appointment and telephone call routing profile are sent to the telephone server 610 at 824. The telephone server 610 then directs calls for the registered telephone user to the destination telephone number for the duration that the telephone call routing profile is active at 828. Control then returns to 804 to await the next date book alarm.

Figure 9:
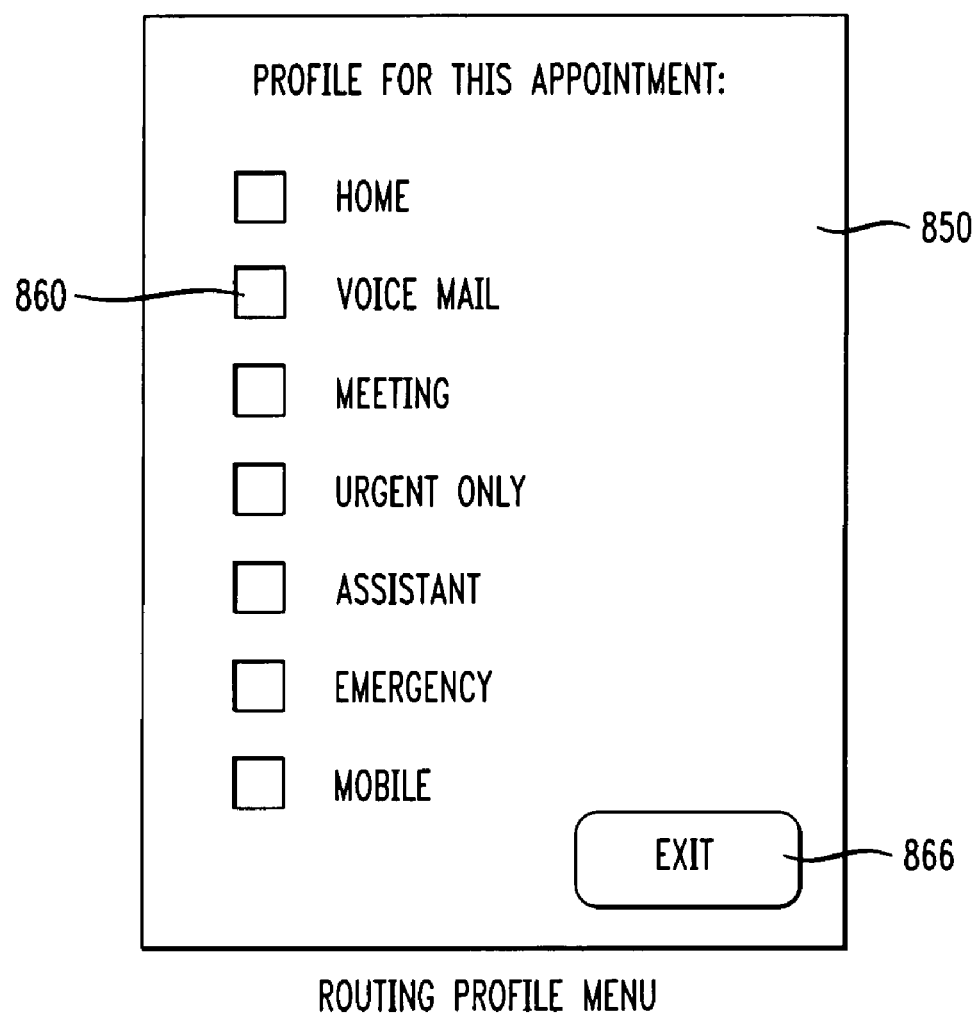
FIG. 9 illustrates an embodiment of a telephone call routing profile menu screen consistent with embodiments of the present invention.

In accordance with process 800, a user therefore makes a selection of a telephone call routing profile whenever an alarm is accepted from the palmtop computer 100. This can be accomplished by displaying a telephone call routing profile menu such as 850 illustrated in FIG. 9. In this illustration, the palmtop computers frame 100 displays screen 850 in which the user can, for example, select the voice mail selection 860 to associate with the current appointment. Thus, for example, if the appointment runs from 10:00 a.m. to 11:00 a.m. all telephone calls incoming during the time period 10:00 a.m. to 11:00 a.m. will be routed to the users voice mail telephone number established in the voice mail telephone call routing profile as shown in TABLE 2. Alternatively, if the user does not wish to associate a telephone call routing profile with a particular appointment, he may simply exit at 866 making no selection of a particular telephone call routing profile.

Figure 10:
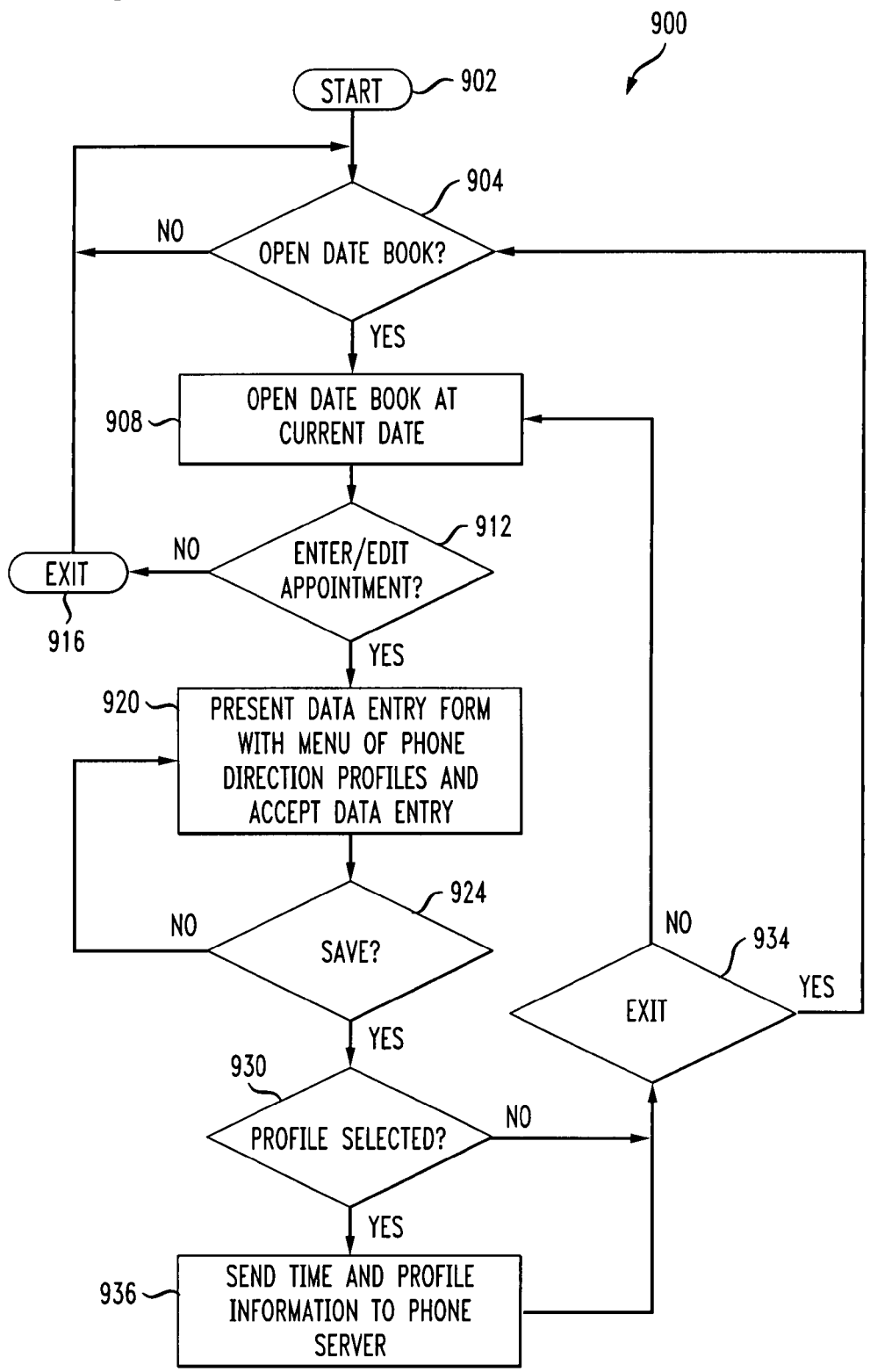
FIG. 10 illustrates a second process for implementing an embodiment of the call routing of the present invention.

An alternative embodiment is illustrated in FIG. 10 as process 900. In this embodiment, starting at 902, the personal information manager application awaits opening of a date book at 904 by the user. Once the date book is opened at 904, it opens to the appointments at the current date at 908. The user can then either enter an appointment at 912 or view the calendar or date book at 912 and exit at 916 to return to 904. If the user chooses to enter or edit an appointment at 912, control passes to 920 where a data entry form is presented to the user after entry or editing of the appointment to permit the user to establish a telephone call routing profile. This would lead to the data entry screen 850 or a similar screen. Upon entry of such a telephone call routing profile, the user saves it at 924 thus associating the telephone call routing profile with the particular appointment in the date book. Once saved at 924, if a telephone call routing profile is not selected at 930, the process can either exit at 934 to return to 904 or can return to the open date of the address book at 908. However, if a telephone call routing profile is selected at 930, control passes to 936 where the time and telephone call routing profile information is sent to the telephone server. The telephone server directs calls using the active telephone call routing profile at the time of the call receipt in accordance with the stored telephone call routing profiles and time information therein. Control then returns to 934.

As a result of the process 900 of FIG. 10, the telephone server 610 establishes a database containing information similar to that illustrated in TABLE 3 below for each user. In such cases, the user can establish-default telephone call routing profiles and exceptions by simply registering appointments in the personal information manager applications date book in the palmtop computer 100. Thus, for example, for the time period from 3:00 p.m. to 5:00 p.m. on November 2, all calls would be routed to the users assistant in accordance with the telephone call routing profile illustrated. Similarly, evenings and Saturdays and Sundays calls will be routed to voice mail with the exception that Monday through Friday during the evenings calls will be routed to the home if from the telephone number 123-555-4321.

TABLE 3

USER PROFILE FOR PHONE NUMBER 123-555-1234
DEFAULT PROFILE: OFFICE
EXCEPTION TABLE:

| DATE | DAY | START TIME | STOP TIME | CALL SOURCE | DESTINATION PROFILE |
|---|---|---|---|---|---|
| | SATURDAY | | | | VOICE MAIL |
| | SUNDAY | | | | VOICE MAIL |
| | MONDAY-FRIDAY | 6:00 PM | 8:00 AM | | VOICE MAIL |
| | MONDAY-FRIDAY | 6:00 PM | 8:00 AM | 123-555-4321 | HOME |
| Nov. 2, 2000 | | 9:00 AM | 10:00 AM | | MEETING |
| Nov. 2, 2000 | | 10:00 AM | 11:30 AM | | MEETING |
| Nov. 2, 2000 | | 11:30 AM | 12:00 AM | | URGENT ONLY |
| Nov. 2, 2000 | | 12:00 AM | 1:00 PM | | MOBILE |
| Nov. 2, 2000 | | 3:00 PM | 5:00 PM | | ASSISTANT |
| Nov. 2, 2000 | | 6:00 PM | 6:30 PM | | MOBILE |
| ... | ... | ... | ... | ... | ... |

Thus, the present invention provides a mechanism for a user to control the routing of telephone calls by use of the personal information manager of his palmtop computer 100 by simply associating a telephone call routing profile with particular appointments or other time periods within the date book. Those skilled in the art will appreciate that the two processes described can be varied in numerous ways without departing from the present invention and can include numerous other details (such as the ability to exit the process at any point) without departing from the invention.

Those skilled in the art will also understand that the information transmitted from the palmtop computer to the telephone server may be formatted in any number of ways that effectively communicate the information required. For example, in some embodiments, only a starting and ending time is transmitted along with an indicator of a selected telephone call routing profile. In this case, the telephone server stores the telephone call routing profile indicator and understands the relationship between the telephone call routing profile and the destination for calls received the time range. In other embodiments, the time range along with specifics of the telephone call routing profile can be transmitted so that the telephone call routing profile itself is only retained in the palmtop computer and the telephone server is sent details required to correctly route calls during the time period. Those skilled in the art will appreciate that many such variations are possible without departing from the present invention. It is also contemplated that default routings can be established for particular times as depicted in TABLE 3, but this is not to be considered limiting on the scope of the invention.

The invention, as described above, provides for the user to control a telephone call via his or her palmtop computer. However, those skilled in the art will understand that the current invention is not so limited. The invention is readily extended to controlling the receipt of faxes by simply providing a similar profile for receipt of fax communication. In a similar manner, an email server can be controlled by the palmtop computer to redirect emails upon receipt of similar information.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will also appreciate that the embodiments described above can be implemented using disc storage as well as other forms of storage including Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention is preferably implemented using a programmed processor executing programming instructions that are broadly described above in flow chart form and can be stored on any suitable electronic storage medium. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of controlling routing of telephone calls and communications in a portable computer, comprising the steps of:

providing a date book as part of a personal information manager application operating on the portable computer;

outputting, on the portable computer, a date book alarm with an audible alert from the date book to alert a user of a particular appointment;

receiving, on said portable computer, an acceptance of said date book alarm;

outputting, on said portable computer, a plurality of routing profiles when said user accepts said date book alarm, wherein a routing profile defines one or more rules for routing incoming telephone calls to one or more telephone numbers associated with said user;

receiving, on said portable computer, a selected routing profile for said particular appointment;

outputting, on said portable computer, said selected routing profile and information relating to said particular appointment; and receiving, on a telephone server, said selected routing profile and said information relating to said particular appointment;

directing, on said telephone server, a plurality of calls using active profiles at a time of receipt of each call, wherein said active profiles comprises said selected routing profile and said information relating to said particular appointment.

2. The method according to claim 1, wherein the audio alert indicates that it is time for said particular appointment.

3. The method according to claim 1, wherein said date book alarm comprises a visual alert that it is time for said particular appointment.

4. The method according to claim 1, further comprising:
receiving, on said portable computer, a new appointment;
outputting, on said palmtop computer, a data entry form to permit said user to establish a routing profile for said new appointment;
outputting, on said portable computer, said established routing profile and information relating to said new appointment to a telephone server, and
wherein active profiles on said telephone server further comprises said established routing profile and said information relating to said new appointment.

5. The method according to claim 1, wherein each of said plurality of routing profiles comprises a destination phone number.

6. The method according to claim 5, wherein said destination phone number is selected from a group of phone numbers associated with said user.

7. The method according to claim 5, wherein one or more of said plurality of routing profiles further comprises a source phone number.

8. A method of controlling communication routing in a portable computer, comprising the steps of:
receiving, on a portable computer, a new appointment;
outputting, on said portable computer, a data entry form to permit said user to establish a routing profile for said new appointment, wherein said routing profile defines one or more rules for routing incoming telephone calls to one or more telephone numbers associated with a user of said portable computer between a starting time and an ending time; and
outputting, on said portable computer, said established routing profile and information relating to said new appointment to a telephone server for activation by said telephone server during a time indicated by said information relating to said new appointment.

9. The method according to claim 8, wherein said established routing profile comprises a destination phone number.

10. The method according to claim 9, wherein said destination phone number is selected from a group of phone numbers associated with said user.

11. The method according to claim 8, wherein said established routing profile further comprises a source phone number.

12. The method according to claim 8, wherein said established information related to said new appointment includes a start time and an end time.

13. A method of controlling communication routing in a portable computer, comprising the steps of:
outputting, on a portable computer, a date book alarm to audibly alert a user of a particular appointment;
receiving, on said portable computer, an acceptance of said date book alarm;
outputting, on said portable computer, a user interface that enables said user to select from a plurality of routing profiles, each of said plurality of routing profiles defining one or more rules for routing incoming telephone calls to one or more telephone numbers associated with said user; and
outputting, on said palmtop computer, an indication of a user selection of a routing profile and information relating to said particular appointment to a telephone server for control of incoming calls to said user during said particular appointment.

* * * * *